April 23, 1963  J. R. YANCEY  3,086,796
PIPE COUPLING WITH WEDGING LOCKING MEANS
Filed Nov. 13, 1958
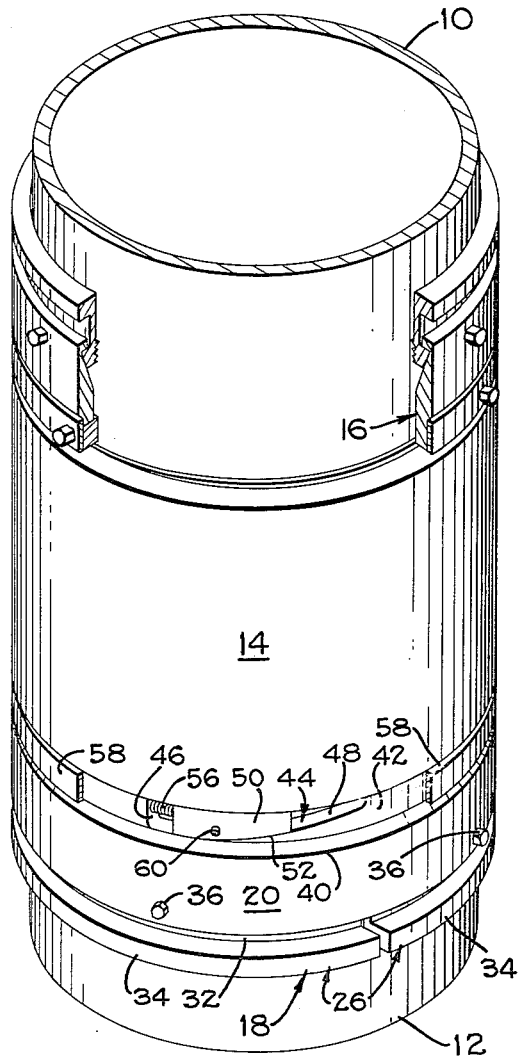
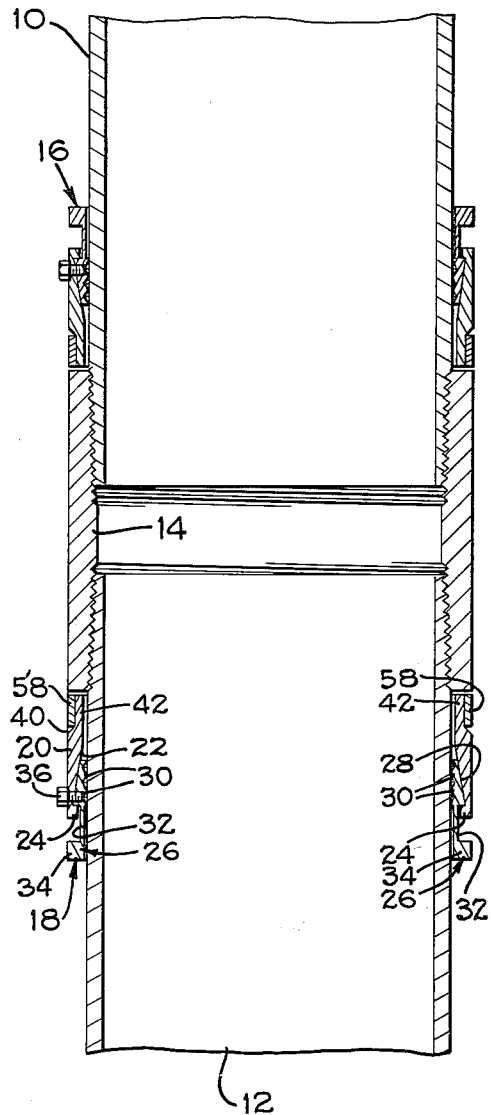
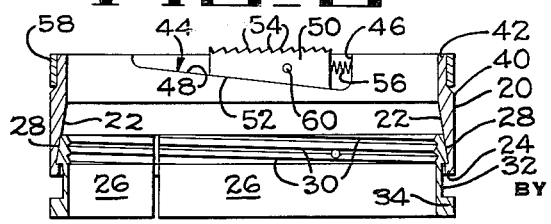
INVENTOR
JOHN R. YANCEY
BY Hans G. Hoffmeister
ATTORNEY 3,086,796
PIPE COUPLING WITH WEDGING
LOCKING MEANS
John R. Yancey, Houston, Tex., assignor, by mesne assignments, to FMC Corporation, San Jose, Calif., a corporation of Delaware
Filed Nov. 13, 1958, Ser. No. 773,624
4 Claims. (Cl. 285—81)

This invention pertains to a device for locking a threaded pipe joint.

The device of the present invention finds particular utility in oil well installations, wherein threaded pipe couplings are subjected to the effects of both vibration and torque and therefore may tend to "back off" or unscrew. Various means have been employed to prevent this action, the most satisfactory of which heretofore has been welding. In order to weld the couplings together welding equipment must be provided at the well site. A welded joint is disadvantageous because after being welded, an assembled coupling can be disassembled only by cutting. Further, there are many instances wherein the piping being used is of a material that is difficult or impossible to weld. Other mechanical locking devices have been employed; however, these mechanical devices have either failed to provide a positive lock or else have been too bulky or complex for efficient use.

It is, therefore, an object of the present invention to provide an improved locking device for positively preventing relative rotation of the respective members of a pipe coupling.

Another object of the invention is to provide a locking device which does not project outwardly beyond the outer circumference of the female coupling member.

Another object is to provide a locking device which can readily be released when it is desired to unscrew the connected members.

Another object is to provide a locking device which can readily be installed in the field without the use of special equipment.

A further object is to provide a locking device which is simple in construction, readily assembled, reliable and durable in operation, and inexpensive to manufacture.

Various other objects and advantages of the invention will become apparent from the following specification and the accompanying drawings, in which:

FIG. 1 is a partly broken away isometric of a pipe coupling joint showing two of the locking devices of the present invention installed thereon.

FIG. 2 is an axial section through the coupling joint illustrated in FIG. 1.

FIG. 3 is an axial section through the locking device per se.

Referring now to the drawings, 10 and 12 represent upper and lower sections of pipe, respectively, threaded into the opposite ends of a female coupling member 14. Two locking devices 16 and 18 of the invention are installed, one on each of the pipe sections 10 and 12, to prevent the pipe sections from unscrewing out of the coupling member 14. Since the two locking devices 16 and 18 are identical, one being inverted with respect to the other, only the lower locking device 18 will be described in detail.

The locking device 18 comprises a body member 20 having the form of a cylindrical sleeve or collar which is adapted to surround the pipe section 12 on which it is mounted into final position after threading the pipe section 12 into the female coupling member 14. The lower portion of the inner face of the body member 20 is tapered downwardly and outwardly as indicated at 22 and terminates in an inwardly projecting shoulder or flange 24.

A plurality of arcuate wedge members 26 are disposed about the pipe section 12. Each of the wedge members 26 is provided with a head portion having a downwardly and outwardly tapered outer surface 28 which is in sliding engagement with the surface 22 on the body member 20. The inner surface of the head portion of each of the wedge members 26 is provided with serrations or teeth 30 adapted to bite into the outer surface of the pipe section 12. A groove 32 is formed in the outer surface of each of the wedge members 26 beneath the head portion thereof. The groove 32 is adapted to receive the inwardly directed flange 24 of the body member 20. The lower end of each of the wedge members 26 terminates in an outwardly projecting flange 34.

While three of these wedge members 26 are shown herein, each extending substantially 120° about the circumference of the pipe section 12, any desired number of wedge members of whatever size desired may be employed.

The wedge members 26 are initially held in assembled relation with the body member 20 by cap screws 36. The cap screws 36 extend through suitable holes in the body member 20, and are threaded into the wedge members 26. When the locking device 18 is installed on the pipe section 12, and the pipe section has been threaded into the coupling member 14, the cap screws 36 are removed and the wedge members 26 are driven upwardly by tapping against the lower faces of the flanges 34, to firmly lock the body member 20 to the pipe section 12.

The body member 20 is provided with an upwardly facing peripheral shoulder 40 adjacent its upper end, and a reduced outside diameter upper portion 42 thereabove. The reduced diameter upper portion 42 of the body member 20 is provided with a plurality of recesses or depressions 44 in its upper edge, spaced equally about its circumference. Each of the depressions 44 is bounded by a vertical face 46 and an inclined bottom cam surface 48 which slopes upwardly away from the vertical surface 46 toward the upper edge of the body member 20.

A wedge shaped slip 50, having a sloping bottom surface 52, is received in each depression 44 with the bottom surface 52 thereof resting on the sloping surface 48 of the depression. The upper surface of each slip 50 is provided with serrations or teeth 54 which are adapted to bite into the end surface of the coupling member 14. A compression spring 56 is interposed between the larger end of each slip 50 and the vertical wall 46 of the associated depression 44 to normally urge the slip 50 away from the deeper end of the associated depression. When such motion occurs the slip slides upwardly along the sloping cam surface 48 to project the teeth 54 on the slip above the upper end of the body member 20.

A retaining ring 58 surrounds the reduced diameter portion 42 of the body member 20 and the several wedge shaped slips 50, to retain the slip members 50 in their respective depressions 44. The retaining ring 58 is fixed to the body member 20 by spot welding or any other suitable means of attachment.

Prior to the installation of the locking device 18, the slips 50 are adapted to be releasably retained in the lowermost portions of the depressions 44, so that their teeth 54 do not project above the body member 20, by a plurality of cap screws 60. The cap screws 60 extend through suitable openings in the retaining ring 58, and are threaded into the slips 50.

After the wedges 26 have been set in the manner described above, the cap screws 60 are removed. The springs 56 then force the slips 50 up the inclined surfaces 48 until the teeth 54 engage the lower end face of the coupling member 14. Any tendency of the pipe section 12 to unthread from the coupling member 14 will cause the body member 20 of the locking device to rotate therewith and the cam surfaces 48 will translate said movement into longitudinal force on the slip members 50 to thus more firmly lock the slip members 50 to the coupling member 14.

When it is desired to disconnect the coupling connection the pipe section 12 is turned slightly in a threading direction relative to the coupling member 14 to bring the threaded holes in the slips 50 into alignment with the holes in the retaining ring 58. The cap screws 60 are then reinserted, and the pipe section 12 with the locking device thereon may now be unthreaded from the coupling member 14. To remove the locking device 18 from the pipe section 12 it is merely necessary to move the body member 20 toward the end of the pipe section thus releasing the wedges 26.

From the foregoing description it may be seen that the pipe coupling locking device of the present invention is capable of positively locking a pipe coupling joint, is easily installed or removed, and does not project outwardly beyond the outer circumference of the female coupling member.

Having thus described my invention what I claim and desire to secure by Letters Patent is:

1. An article of manufacture adapted to prevent disconnection of a threaded cylinder screwed into engagement with a complementary threaded coupling which coupling defines an annular axially facing abutment face extending about said cylinder, comprising a cylindrical collar defining an opposing abutting face at one end thereof and an internal taper extending radially outward toward its other end, a cam depression in said abutting face of said collar terminating at one end at a support surface perpendicular to said abutting face of the collar, said cam depression being partly defined by a cam surface sloping from said one end toward said abutting face of the collar, a slip member positioned in said cam depression and slidably resting on said cam surface, means disposed within said depression and between said slip member and said support surface adapted to force said slip member along said cam surface into contact with said annular abutting shoulder on the coupling member, said slip member defining a restraining surface facing said annular shoulder on the coupling member, a wedge member fitted within said internal taper and adapted to support said abutting face of the collar adjacent the abutment face of the coupling when the wedge member is forced into said taper between said collar and said cylinder, said wedge member defining gripping serrations facing said cylinder.

2. A locking device for securing a cylindrical male member in continued threaded connection with a female coupling member, comprising a body member surrounding said male member, said body member having an inner surface inclined radially outward and away from the coupling member, a plurality of wedge members, each of said wedge members having an inclined outer surface in sliding contact with said inclined inner surface whereby said wedge members are adapted to be wedged between said inner surface and the outer surface of said male member, a plurality of slips adapted to be mounted between said body member and said coupling member, and cam surfaces on said body member engaging said slips and adapted to translate unthreading motion between said male member and said coupling member into longitudinal forces urging said slips into locking position against the end portion of said coupling member in one direction and urging said body member into tighter engagement with said wedge members in the other direction.

3. The locking device of claim 2 wherein the inner peripheral surfaces of the wedge members have teeth to bite into the cylindrical surface of said male member to prevent longitudinal movement of said male member away from said female coupling member.

4. The locking device of claim 2 wherein said coupling member has an annular end face, wherein said cam surfaces are adapted to confront said end face of said coupling member, and wherein each of said slips has a sloping surface slidably engaging its respective cam surface and an outwardly projecting gripping surface adapted to frictionally engage said end face of the coupling member.

References Cited in the file of this patent

UNITED STATES PATENTS

| | | |
|---|---|---|
| 1,250,241 | Stafford | Dec. 18, 1917 |
| 1,254,927 | Neckerman | Jan. 29, 1918 |
| 1,614,603 | De Wire | Jan. 18, 1927 |
| 1,669,186 | Bunker | May 8, 1928 |
| 2,444,216 | Allen | June 29, 1948 |

FOREIGN PATENTS

| | | |
|---|---|---|
| 684,466 | Germany | Nov. 29, 1939 |